(12) United States Patent
Walker

(10) Patent No.: US 9,591,188 B2
(45) Date of Patent: Mar. 7, 2017

(54) CASCADED BIT SEQUENCES IN DISPLAY SYSTEMS

(71) Applicant: Brass Roots Technologies, LLC, Plano, TX (US)

(72) Inventor: Bradley William Walker, Dallas, TX (US)

(73) Assignee: BASS ROOTS TECHNOLOGIES, LLC, Plano, TX (US)

( * ) Notice: Subject to any disclaimer, the term of this patent is extended or adjusted under 35 U.S.C. 154(b) by 131 days.

(21) Appl. No.: 14/446,374

(22) Filed: Jul. 30, 2014

(65) Prior Publication Data

US 2015/0036049 A1    Feb. 5, 2015

Related U.S. Application Data

(60) Provisional application No. 61/861,101, filed on Aug. 1, 2013.

(51) Int. Cl.

| | |
|---|---|
| *G06F 3/14* | (2006.01) |
| *H04N 5/04* | (2006.01) |
| *H04N 5/21* | (2006.01) |
| *G09G 3/00* | (2006.01) |
| *G09G 3/20* | (2006.01) |
| *G09G 3/34* | (2006.01) |

(52) U.S. Cl.
CPC ............. *H04N 5/04* (2013.01); *G06F 3/1423* (2013.01); *G09G 3/002* (2013.01); *G09G 3/2029* (2013.01); *G09G 3/3426* (2013.01); *H04N 5/21* (2013.01); *G09G 2320/0646* (2013.01)

(58) Field of Classification Search
CPC .......... G06F 3/1423; H04N 5/04; H04N 5/21; G09G 3/2029; G09G 3/3426; G09G 3/002; G09G 2320/0646
See application file for complete search history.

(56) References Cited

U.S. PATENT DOCUMENTS 6,774,916 B2    8/2004    Pettitt et al.
7,446,785 B1    11/2008    Hewlett et al.
(Continued)

OTHER PUBLICATIONS

European Patent Office; International Search Report and Written Opinion; PCT Application No. PCT/US2014/048761; Oct. 9, 2014.
(Continued)

*Primary Examiner* — Premal Patel
(74) *Attorney, Agent, or Firm* — Jackson Walker LLP

(57) ABSTRACT

The present disclosure pertains to a method for designing cascaded bit sequences for cascaded digital displays. The method avoids unwanted interactions between cascaded sequences in cascaded digital displays. By using sequences with a particular structure, cascaded sequences can be designed such that no sequence is affected by the others. The following rules must be followed in constructing the sequence. First, the display devices must be frame-locked, so that the timing relationship between the sequences is maintained throughout each frame. Second, for each display device, the ratio of bit plane weights must remain constant, regardless of the pixel data displayed on the other display device(s). Third, the amount of bit plane skew must remain constant, regardless of the pixel data displayed on the other display device(s). Fourth, bit plane phased leakage must be compensated for or avoided.

14 Claims, 17 Drawing Sheets

(56) References Cited

U.S. PATENT DOCUMENTS

| | | | |
|---|---|---|---|
| 7,576,759 B2 | 8/2009 | Pettitt et al. | |
| 2003/0142872 A1* | 7/2003 | Koyanagi | H04N 21/234327 |
| | | | 382/236 |
| 2005/0001859 A1* | 1/2005 | Kawaharea | G09G 3/2022 |
| | | | 345/690 |
| 2008/0158245 A1 | 7/2008 | Lieb et al. | |
| 2009/0129746 A1* | 5/2009 | Isnardi | H04N 5/913 |
| | | | 386/252 |

OTHER PUBLICATIONS

The International Bureau of WIPO; International Preliminary Report on Patentability; PCT Application No. PCT/US2014/048761; Feb. 11, 2016.

* cited by examiner

Figure 2

All Combinations

| Bit Code | Bit Vector | Weight |
|---|---|---|
| 0 | 00000 | 0 |
| 1 | 00001 | 3 |
| 2 | 00010 | 2 |
| 3 | 00011 | 5 |
| 4 | 00100 | 1 |
| 5 | 00101 | 4 |
| 6 | 00110 | 3 |
| 7 | 00111 | 6 |
| 8 | 01000 | 2 |
| 9 | 01001 | 5 |
| 10 | 01010 | 4 |
| 11 | 01011 | 7 |
| 12 | 01100 | 3 |
| 13 | 01101 | 6 |
| 14 | 01110 | 5 |
| 15 | 01111 | 8 |
| 16 | 10000 | 3 |
| 17 | 10001 | 6 |
| 18 | 10010 | 5 |
| 19 | 10011 | 8 |
| 20 | 10100 | 4 |
| 21 | 10101 | 7 |
| 22 | 10110 | 6 |
| 23 | 10111 | 9 |
| 24 | 11000 | 5 |
| 25 | 11001 | 8 |
| 26 | 11010 | 7 |
| 27 | 11011 | 10 |
| 28 | 11100 | 6 |
| 29 | 11101 | 9 |
| 30 | 11110 | 8 |
| 31 | 11111 | 11 |

Figure 3

Selected and
Renumbered
Combinations

| Bit Code | Bit Vector | Weight |
|---|---|---|
| 0 | 00000 | 0 |
| 1 | 00100 | 1 |
| 2 | 00010 | 2 |
| 3 | 00001 | 3 |
| 4 | 00101 | 4 |
| 5 | 00011 | 5 |
| 6 | 00111 | 6 |
| 7 | 01011 | 7 |
| 8 | 01111 | 8 |
| 9 | 10111 | 9 |
| 10 | 11011 | 10 |
| 11 | 11111 | 11 |

CASCADED BIT SEQUENCES IN DISPLAY SYSTEMS

This application claims priority to U.S. Provisional Patent Application Ser. No. 61/861,101, filed Aug. 1, 2013, entitled "Cascaded Bit Sequences in Display Systems," the entire content of which is hereby incorporated by reference.

BACKGROUND

The present disclosure pertains generally to image display systems using cascaded or multistage display devices and more particularly to display systems that use a cascade of digital display devices.

A cascaded or multistage display system is an optical system where the light output of one display device becomes the input to another display device. The output of a cascaded display is approximately equal to the pixel-by-pixel multiplicative product of the cascaded display devices. Generally, cascading two devices is sufficient, but more could be cascaded for further improvement. Also, in multi-color systems, there may be multiple sets of cascaded displays, as may be required to separately modulate one or more colors per cascade.

Using display devices in a cascade provides advantages, such as:
1. Increased contrast ratio (i.e. dynamic range). The contrast ratio of the cascade is the product of the contrast ratios of the individual displays. Thus, two devices that individually produce a 500:1 contrast ratio, in cascade can produce a 250,000:1 contrast ratio.
2. Increased bit depth. The cascaded bit depth is approximately the sum of the bit depths of the individual displays.
3. Reduced pulsed width modulation (PWM) artifacts (in PWM-based displays).
4. Reduced dither noise (in displays that use dither).
5. Reduced performance requirements for one or both display devices, as the work is shared between the multiple devices. Thus, two low capability devices in cascade can create a better image than either device alone.

Display devices convert electrical signals into light levels that make up the displayed image. Digital display devices are a subset of display devices, and are capable of displaying a finite number of discrete light levels, or gray shades, per pixel. Binary (two state) displays are a subset of digital display devices that can display only one of two light levels per pixel at any instance in time, the two light levels being fully ON (white) or fully OFF (black).

Examples of digital display devices include: the Digital Micromirror Device (DMD) from Texas Instruments (Dallas, Tex.), the Digital Liquid Crystal on Silicon (D-LCOS) device, the VueG8 technology from Syndiant (Dallas, Tex.), and the Plasma Display Panel (PDP), and light emitting diode (LED) displays. Some analog imaging devices can also be operated as a digital display, including the D-ILA device from JVC-Kenwood (Kanagawa, Japan).

An image is composed of rows and columns of pixels. Each pixel of a frame has associate data that represents the light intensity and, in multicolor displays, the color of the pixel. The data is comprised of one or more binary bits (zeros or ones). The value each bit represents may be a binary weighting (powers of 2), or some other, possibly arbitrary, weighting.

In order to enable a digital display system to show more gray shades than the intrinsic capabilities of the digital imaging device, some sort of modulation in time of the digital imaging device is required, e.g. PWM. The digital imaging device is modulated with a signal such that the intensities of the displayed pixels average to the desired gray shade, over a time frame short enough that the human vision system will perceive these average pixel levels, rather than the modulating signal.

One approach to generating this digital imaging device modulating signal is to convert the incoming image data into bit planes, with each bit plane representing a bit weight of the intensity values. If each pixel's intensity is represented by an N-bit value, each image frame will have N bit planes. Each bit plane has a 0 or 1 value for each pixel. The bit weight is often binary (i.e. a power of two), but is not limited to binary ratios. For example, a 4-bit video signal may have 4 bit planes, with bit weights of 0.5, 0.25, 0.125, and 0.0625. Equivalently, the weights may be stated in integer form: (8, 4, 2, and 1), as the salient aspect of the bit weights is their ratios.

Using multi-level halftoning (multitoning), the incoming image data can be converted to a representation using more, or fewer, bits per pixel. Multitoning can also convert from a binary (bits are powers of 2) representation to a representation with arbitrary weights per bit. This provides the ability to use arbitrary numbers of bit planes, with arbitrary bit weights, as will be apparent to one skilled in the art of multitoning.

Each image is displayed for an amount of time called the frame time. An image frame can be subdivided into time slots, known as bit segments. Each bit segment is displayed for an amount of time that is proportional to the desired bit weight of the bit segment. The bit segments can be all the same weight, or they can vary by segment. If the illumination is variable, this will also affect the bit weight of the bit segments. Some digital displays (e.g. DMD) can produce shorter bit segments if one or more adjacent bit segment is lengthened. Short bit segments are desired for high effective bit depth, but require more data bandwidth and device speed.

Each bit plane is displayed in one or more bit segments, with the bit weight of each bit plane being equal to the sum of the bit weights of the associated bit segments. The length of time each bit plane is displayed is proportional to the bit weight of the bit plane. During a bit segment, all the pixels of a binary display will be ON or OFF, depending on the related bit plane data.

Due to display device characteristics, there may be a time skew across the device, resulting in the bit plane data being displayed at different times in different areas. Display devices may update the bit plane data pixel-by-pixel, line-by-line, or in blocks, depending on the device capabilities.

Multi-bit bit planes can be used to operate digital displays that can produce more than two shades (ON and OFF). The number of bits per bit plane is a function of the number of possible shades provided by the digital display device, as will be apparent to one skilled in the art.

The arrangement of the bit segments in time and their associated bit weights and bit planes, is called the bit sequence (the "sequence"). The design of bit sequences involves reconciling the various aspects of display quality, including bit depth, dark noise, bandwidth, light efficiency, color artifacts, and motion artifacts.

Typically, not all possible combinations of bit planes are used. For example, a cinema display running at 24 frames per second and using a DMD with an average bit segment of 170 us can display about 260 bit segments per frame. Using one bit plane per bit segment, if every possible combination of bit planes was used, there would be 2^260 combinations, or about 10^78. This is obviously more than is required or practical. In addition, many combinations are redundant, as they have the same or very similar bit weight. In practice, a subset of combinations is chosen, with a total count ranging from dozens to hundreds of combinations. Each chosen combination of bit planes, termed a "bit code", has an aggregate bit weight, and thus a gray level, as well as a bit vector representing the bit planes that should be ON, or '1'.

Almost all sequences used in applications at or below 120 frames per second, use repeated sub-sequences of identical, or nearly identical, arrangements of bit segments and bit planes. This provides an opportunity to apply multiple halftone or multitone images to a secondary display. For example, DMD cinema displays operating at 24 frames per second are actually displaying each image four times, for a 96 Hz. sub-sequence rate. This gives the opportunity to have four halftone images, which, when integrated by the human visual system, gives the appearance of two extra bits of bit depth. Another way of describing this effect is that the halftone dots appear at 25% contrast, rather than 100% contrast. (See U.S. Pat. No. 6,774,916 and U.S. Pat. No. 7,446,785 and U.S. Pat. No. 7,576,759, incorporated herein by reference).

In the context of a cascade display system, a primary display is a display that is in sharp focus. A secondary display is a display that is not in sharp focus. A cascade display system consists of an illumination source, one or more primary display devices, zero or more secondary devices, one or more relay optics, and supporting optics, mechanics, and electronics.

Cascade displays using digital display devices cannot use conventionally designed bit sequences without unwanted interactions between the display devices. If the display devices are not frame locked, strobing (i.e. low to medium frequency intensity changes) and non-deterministic behavior (i.e. the same image data gives different results on successive viewings) can occur.

Even if frame locked, conventional sequences will interact in a cascade display, causing undesirable artifacts including nonlinearity (i.e. discontinuities in images that should be smooth), flicker (undesirable intensity changes at a sub-multiple of the frame rate), banding (i.e. on devices that have regions with different timing, such as phased reset DMDs, the regions can have differing behavior), severe color errors, and dither visibility, particularly when 1-bit dither patterns are used.

One approach to avoiding artifacts is to restrict the secondary display to use a 1-bit sequence with halftoning. The disadvantage of this is the visibility of the halftone dots, which are either full ON or full OFF.

SUMMARY

The present disclosure pertains to a method to avoid unwanted interactions between sequences in cascaded digital displays. By using sequences with a particular structure, cascaded sequences can be designed such that neither sequence is affected by the other(s), other than the desired multiplication of image intensity. This can be accomplished by following certain rules in constructing the sequences. The method adds one or more bits of depth for at least one, multiple, or each sub-sequence in a frame. Each sub-sequence can have a different weighting of the one or more additional bits. The bits can have binary (power of two) or arbitrary weights. Short bits are created without additional dark time, increasing light (timeline) efficiency compared to other methods.

The method for designing cascaded bit sequences for cascaded digital displays is an improvement over current methods for multiple reasons. First, interaction between sequences is minimized or eliminated. There is also improved bit-depth and reduced PWM artifacts. Less optical blur is required for equivalent secondary display device dynamic range. Less optical blur of secondary display device(s) results in fewer spatial artifacts, such as halos, and reduces the required amount of compensation for blur. Display system dynamic range is increased—which means smaller effective least significant bits. Smaller effective least significant bits reduces visibility of halftone and multitone patterns. Digital display devices in a cascade can work independently, except for frame synchronization. Further, bit segment rate interleave exists, rather than only frame or sub-frame rate interleave. This improves flicker performance and artifact cancellation. Finally, compared to previously existing systems, the present method is more time-line efficient (e.g. more display system light throughput), as short bits can be created without associated dark time.

BRIEF DESCRIPTION OF DRAWINGS

FIG. 2 shows all possible combinations of the sequence of FIG. 1;

FIG. 3 shows an example selection of combinations from FIG. 2;

DETAILED DESCRIPTION OF PREFERRED EMBODIMENTS

Figure 1:
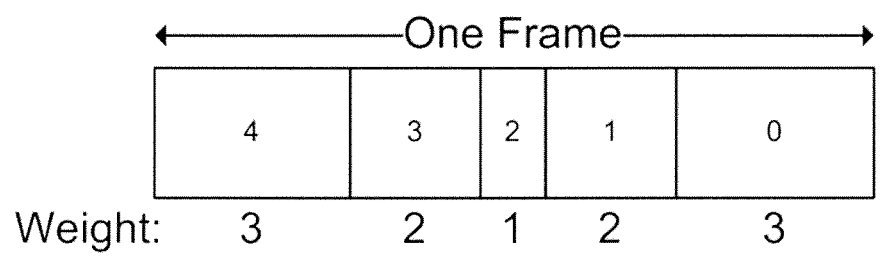
FIG. 1 shows an example of a simple bit sequence.

FIG. 1 shows an example of how an image frame can be divided into a simple sequence, comprising 5 bit segments, one bit segment per bit plane. The bit planes are numbered 0 to 4, having weights of 3,2,1,2, and 3, respectively. As shown in FIG. 2, there are 25 (or 32) possible combinations of the sequence of FIG. 1. Note that there are many redundant weights. FIG. 3 shows an example selection of combinations from FIG. 2. Redundancies have been removed and the bit codes have been renumbered. This is one of many possible selections.

Figure 4:
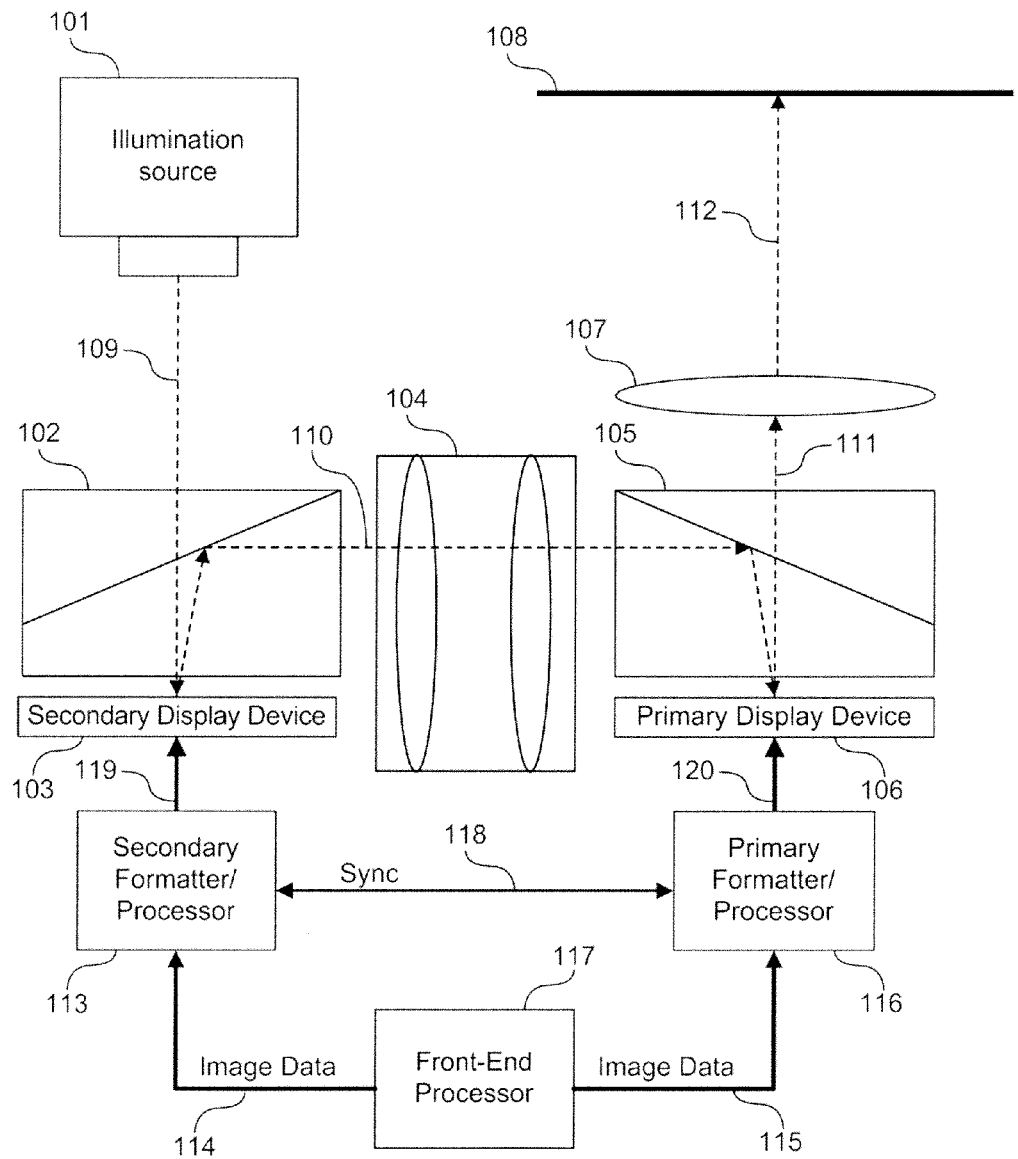
FIG. 4 schematically illustrates an example cascaded display system.

An example cascaded display system is schematically illustrated in FIG. 4. Referring to FIG. 4, the cascaded display system comprises secondary display device 103 and primary display device 106. Secondary display device 103 is driven and controlled by secondary formatter/processor 113; and primary display device 106 is driven and controlled by primary formatter/processor 116. Front-end processor 117 is connected to secondary and primary formatter/processors through links 114 and 115, controlling the operations of the displays and providing image data and timing information to the displays. Sync or timing information may also be transmitted between primary formatter/processor 116 and secondary formatter/processor 113 by an optional link 118. Light 109 from illumination source 101 is directed to secondary display device 103 through TIR prism 102. The image 110 produced by secondary display device 103 is projected onto primary display device 106 by relay optic 104 and TIR prism 105. Primary display device 106 modulates the light image 110 from the secondary display device 103 and produces an image 112 that is projected onto a screen or target 108 by projection lens 107.

Each display device comprises an array of individually addressable pixels, such as reflective and deflectable micromirrors, liquid-crystal cells, LCOS cells, emissive plasma cells, or other types of devices. The secondary and primary display devices may have the same or different natural resolutions. For example, each of the primary and secondary display devices may have a natural resolution of 640×480 (VGA) or higher, such as 800×600 (SVGA) or higher, 1024×768 (XGA) or higher, 1280×1024 (SXGA) or higher, 1280×720 or higher, 1400×1050 or higher, 1600×1200 (UXGA) or higher, 1920×1080 (HDTV) or higher, 2048×1080 (DCI 2K) or higher, 2560×1600 (WQXGA) or higher, 3840×2160 (UHDTV1) or higher, 4096×2160 (DCI 4K) or higher, 7680×4320 (UHDTV2) or higher, 8192×4320 (8K) or higher.

Cascaded bit sequences designed according to the present method use a particular structure so that no sequence operating on a display device is affected (in an undesireable manner) by a sequence operating on another display device in a cascaded display system. The following rules must be followed in constructing the sequence. First, the display devices must be frame-locked. Second, for each display device, the ratio of bit plane weights must remain constant, regardless of the pixel data displayed on the other display device(s). Third, for each display device, the amount of bit plane skew must remain constant, regardless of the pixel data displayed on the other display device(s). Fourth, bit plane phased leakage must be compensated for or avoided. It is understood that deviation from these rules may be allowed if some interaction between display devices is acceptable for a particular application.

In greater detail, to avoid unwanted interaction between cascaded digital display devices, the following must be controlled by the design of the sequences. First, the display devices must be frame-locked, so that the timing relationship between the sequences is maintained throughout each frame. Second, there must be a constant ratio of bit plane weights. For any combination of bit planes on a given display device, the ratio of the resulting weights of the bit planes on other display device(s) must remain constant. Third, there must be constant bit plane skew. For any combination of bit planes on a given display device, the resulting skew of the bit planes on other display device(s) must remain constant. Fourth, there must be zero bit plane phased leakage. For any combination of bit planes on a given display device, the net phased leakage of the given device must be zero, or compensated for by some other means (e.g. image processing of pixel data).

Figure 5:
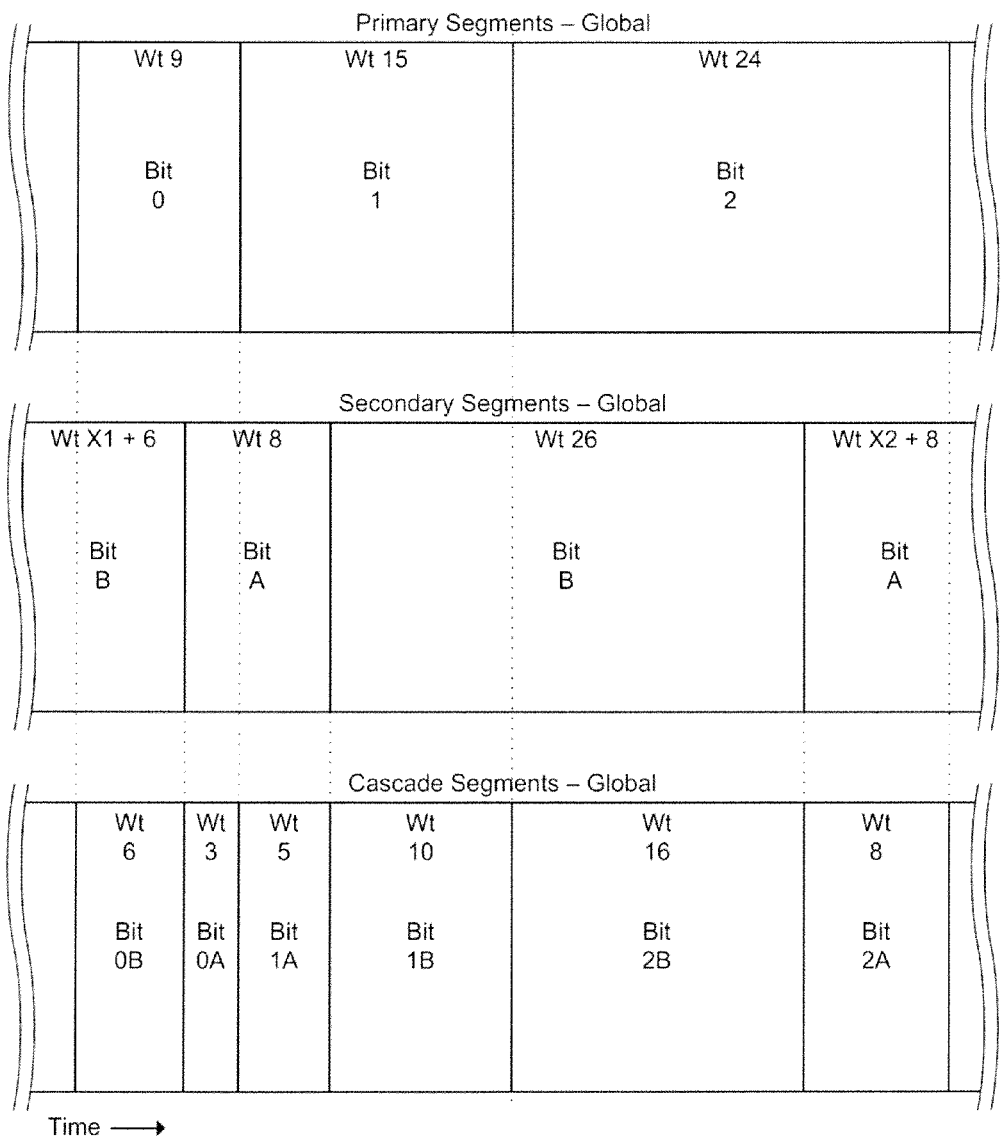
FIG. 5 shows an example of a cascaded global sequence with 2 secondary bits.

Some digital display devices, such as the DMD, can be operated in a global update mode, where all the pixels in the frame are updated simultaneously. FIG. 5 is an example of cascaded global sequences. Referring to FIG. 5, the three graphs represent a portion of a frame, with the horizontal axis representing time, and the vertical axis representing vertical location on the device. As this is a global sequence, the bit segments have vertical boundaries, indicating simultaneous update. The primary segments, labeled Bit 0, Bit 1, and Bit 2, make up a section of the primary sequence, and can be of standard PWM sequence design practice, as will be apparent to one skilled in the art.

The secondary segments are not standard sequence design. This secondary sequence has two bit planes, Bit A and Bit B, which are used to split the bit segments and bit planes of the primary sequence into two sections, keeping the ratio of the sections constant, e.g. Bit B section to Bit A section ratio is 2:1. The result of cascading such primary and secondary sequences is shown in the third graph of FIG. 5. The cascaded bit segments are the multiplicative product of the primary and secondary sequences, consisting of Bits 0B, 0A, 1A, 1B, 2B, and 2A. Bit 0B is ON when both Bits 0 and B are ON. Bit 0A is ON when both Bits 0 and A are ON. Bits 1A, 1B, 2B, and 2A operate similarly.

In this example, the timing and bit weight of the secondary sequence is designed such that when Bit A is ON and Bit B is OFF, Bits 0A, 1A, and 2A are ⅓ the weight of Bits 0, 1, and 2, and Bits 0B, 1B, and 2B are OFF (zero weight). When Bit A is OFF and Bit B is ON, Bits 0B, 1B, and 2B are ⅔ the weight of Bits 0, 1, and 2, and Bits 0A, 1A, and 2A are OFF (zero weight). When Bit A is ON and Bit B is ON, Bit 0B plus Bit 0A are the full weight of Bit 0, Bit 1A plus Bit 1B are the full weight of Bit 1, and Bit 2B plus Bit 2A are the full weight of Bit 2. Thus the ratio of Bits B to A is 2:1. These results are summarized in Table 1 below, with 0 representing OFF and 1 representing ON, and X representing any value (don't care).

TABLE 1

| Bit 0 | Bit 1 | Bit 2 | Bit A | Bit B | Cascade Weight | Ratio to Primary Bit |
|---|---|---|---|---|---|---|
| X | X | X | 0 | 0 | 0 | 0.0 |
| 0 | 0 | 0 | X | X | 0 | 0.0 |
| 1 | 0 | 0 | 1 | 0 | 3 | 0.333 Bit 0 |
| 0 | 1 | 0 | 1 | 0 | 5 | 0.333 Bit 1 |
| 0 | 0 | 1 | 1 | 0 | 8 | 0.333 Bit 2 |
| 1 | 0 | 0 | 0 | 1 | 6 | 0.667 Bit 0 |
| 0 | 1 | 0 | 0 | 1 | 10 | 0.667 Bit 1 |
| 0 | 0 | 1 | 0 | 1 | 16 | 0.667 Bit 2 |
| 1 | 0 | 0 | 1 | 1 | 9 | 1.00 Bit 0 |
| 0 | 1 | 0 | 1 | 1 | 15 | 1.00 Bit 1 |
| 0 | 0 | 1 | 1 | 1 | 24 | 1.00 Bit 2 |

This example illustrates one of the key requirements of cascaded sequences: the ratios between Bit 0, Bit 1, and Bit 2 are constant, regardless of the state of Bits A and B. Also, the ratio between Bit A and Bit B is constant, regardless of the state of Bits 0, 1, and 2. This allows the primary and secondary displays to operate independently without interaction or interference. The primary display requires no knowledge of the secondary display's image data, and vice versa.

Figure 6:
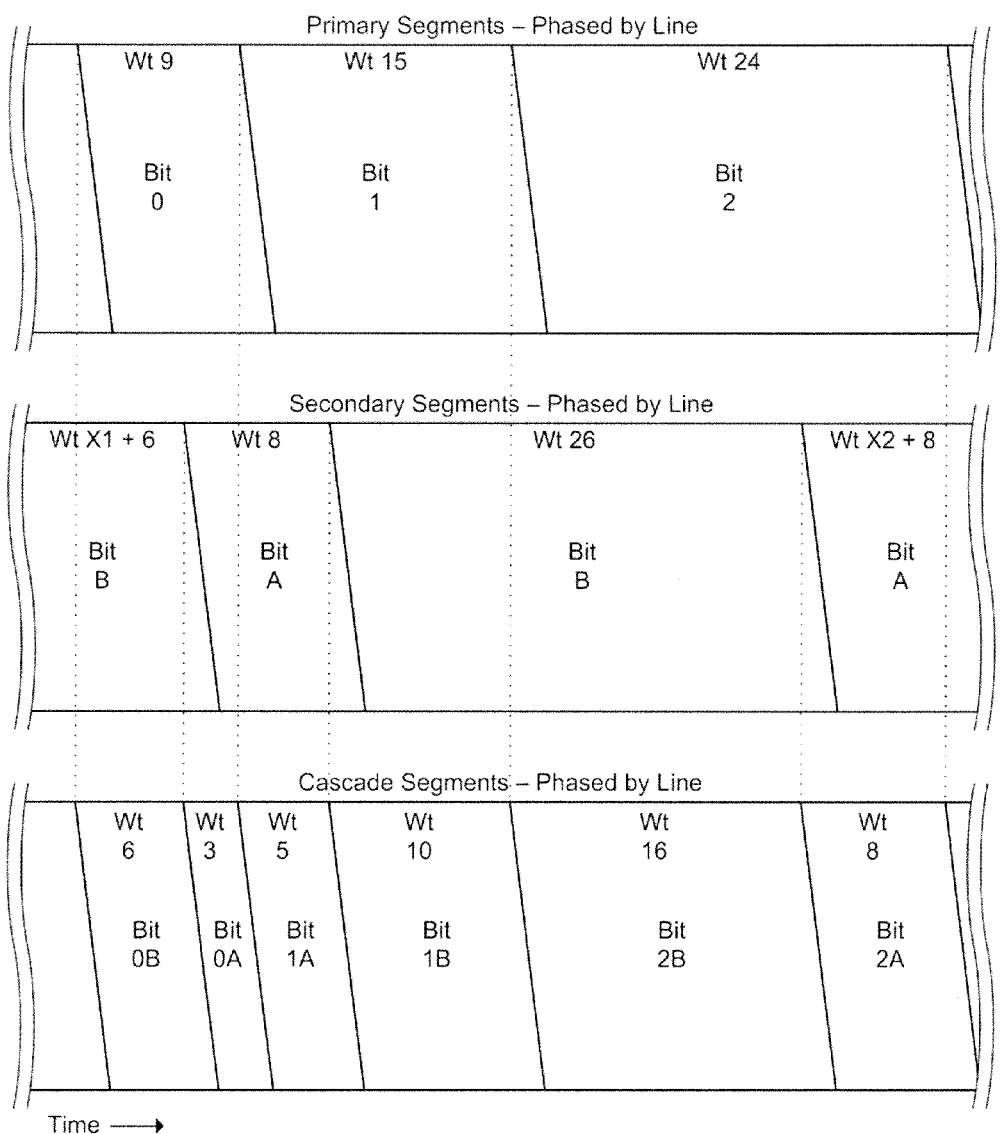
FIG. 6 shows an example of cascaded line-by-line phased sequence with 2 secondary bits.

Similarly, FIG. 6 represents an example of a cascaded sequence for display devices that update line-by-line, as indicated by the slanting edges of the bit segments. As in the global case, the sequences are constructed to avoid interference or interaction.

Figure 7:
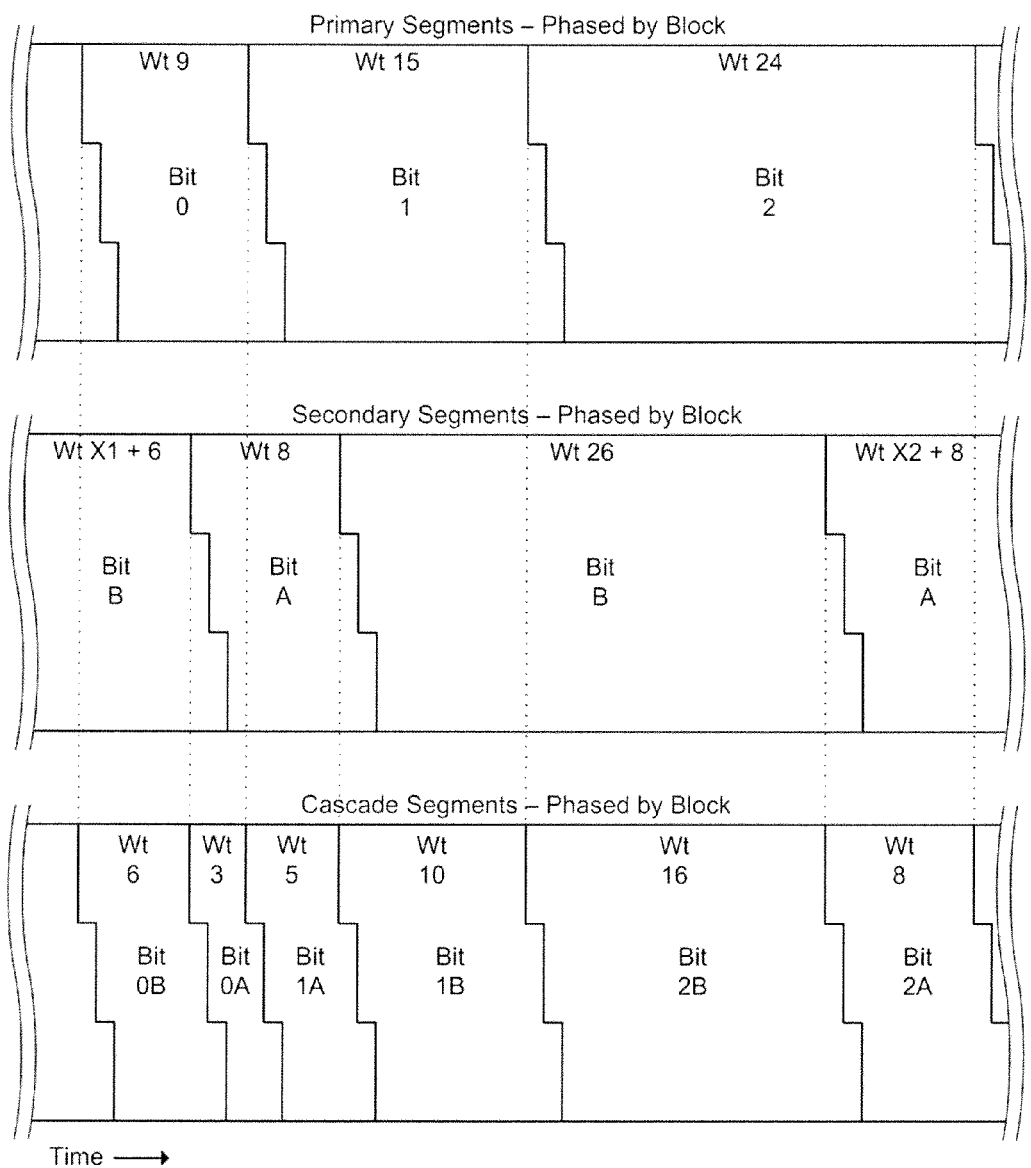
FIG. 7 shows an example of cascaded block-by-block phased sequence with 2 secondary bits.

Similarly, FIG. 7 represents an example of a cascaded sequence for display devices that update block-by-block, as indicated by the stair step edges of the bit segments. As in the global case, the sequences are constructed to avoid interference or interaction.

Figure 8:
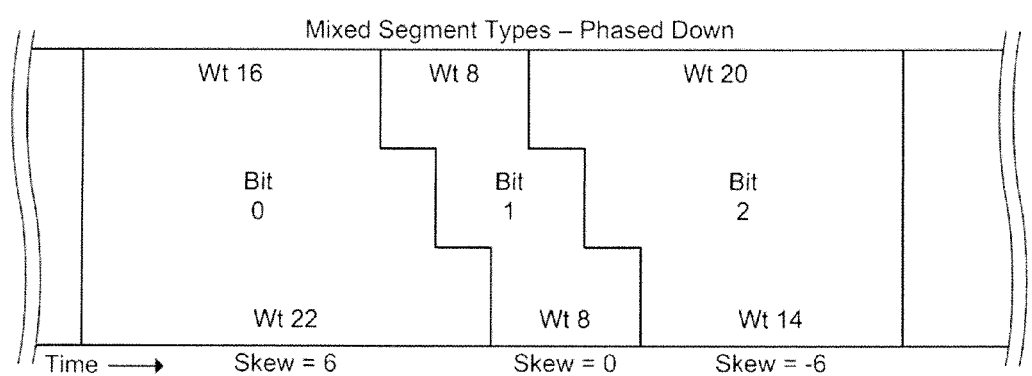
FIG. 8 shows an example of mixed segment types, phased down.
Figure 9:
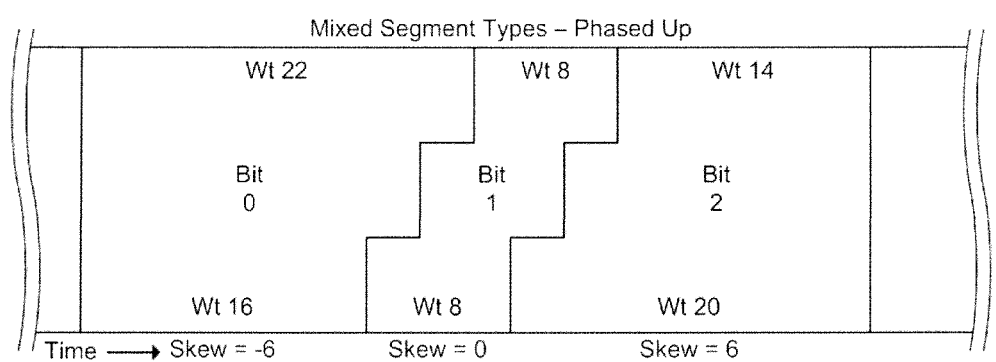
FIG. 9 shows an example of mixed segment types, phased up.
Figure 10:
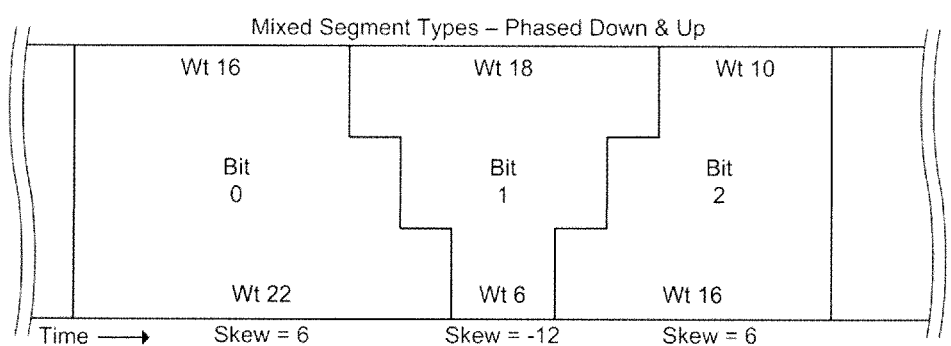
FIG. 10 shows an example of mixed segment types, phased up and down.

FIG. 8 shows an example of "phased-down" operation, where image data is loaded in blocks from the top to the bottom of a display device. FIG. 9 shows an example of "phased-up" operation, where image data is loaded in blocks from the bottom to the top of a display device. FIG. 10 shows an example of mixed phased-up and phased-down operation.

For display devices that update in the vertical direction, skew is the change in bit weight of a bit segment from the top to the bottom of the image. All-global sequences have zero skew in all bit segments. Positive skew means the bit segment weight increases from the top to the bottom of the image, as shown by Bit 0 of FIG. 8. Negative skew means the bit segment weight increases from the top to the bottom of the image, as shown by Bit 2 of FIG. 8. Zero skew means the bit segment weight remains constant from the top to the bottom of the image, as shown by Bit 1 of FIG. 8. The skew of a bit plane is the sum of the bit segments that make up the bit plane. If the skew of a bitplane is not zero (to within visual tolerance) then the bit plane will have non-uniform weight (changing in intensity or brightness) from the top to the bottom of the image. Thus, each bit plane should have zero (or near zero) skew, or it must only be used in conjunction with one or more other bit planes, such that the sum of the skews of the bit planes is zero (or near zero).

Figure 16:
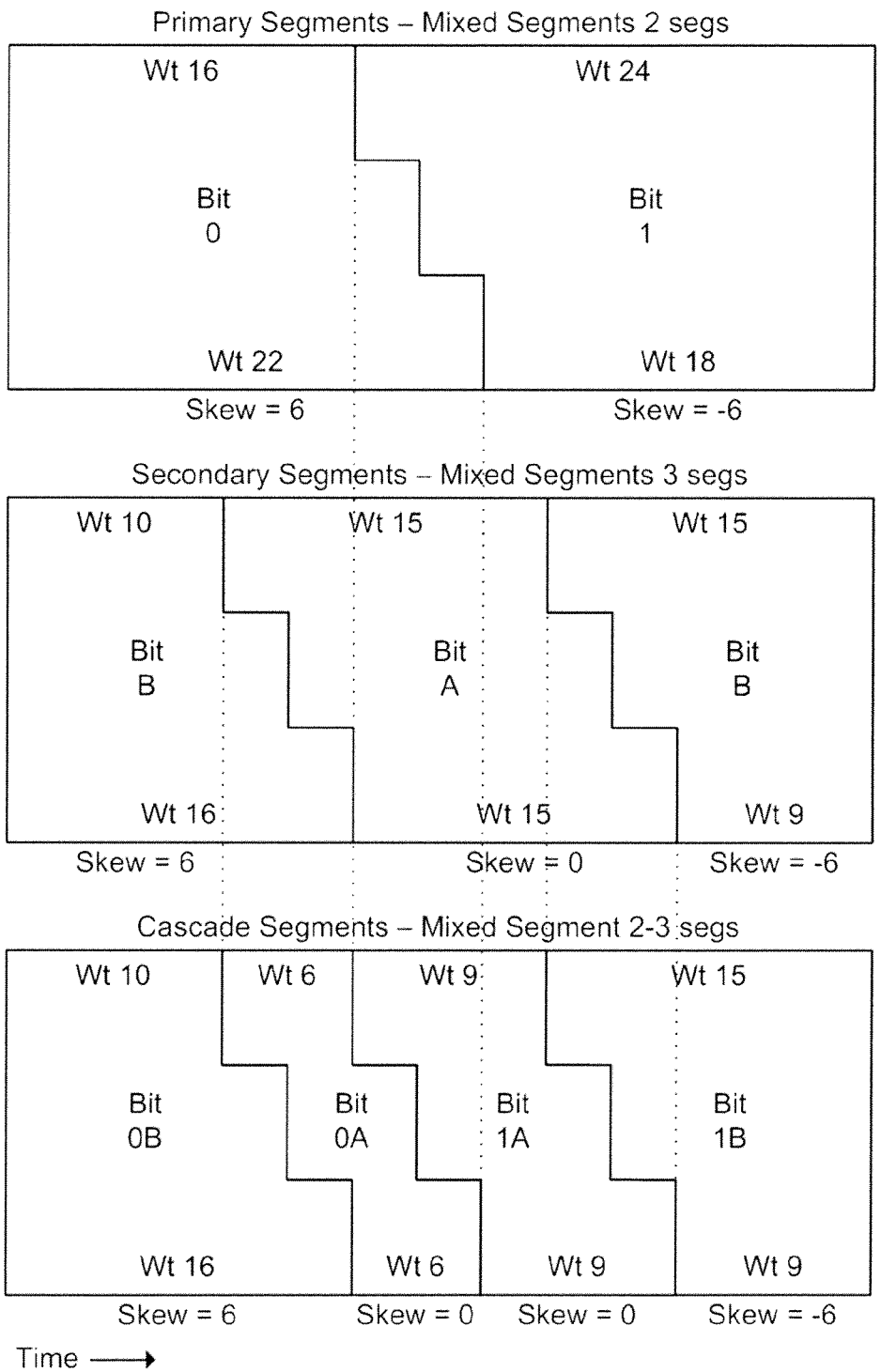
FIG. 16 shows an example mixed-mode sequence.
Figure 17:
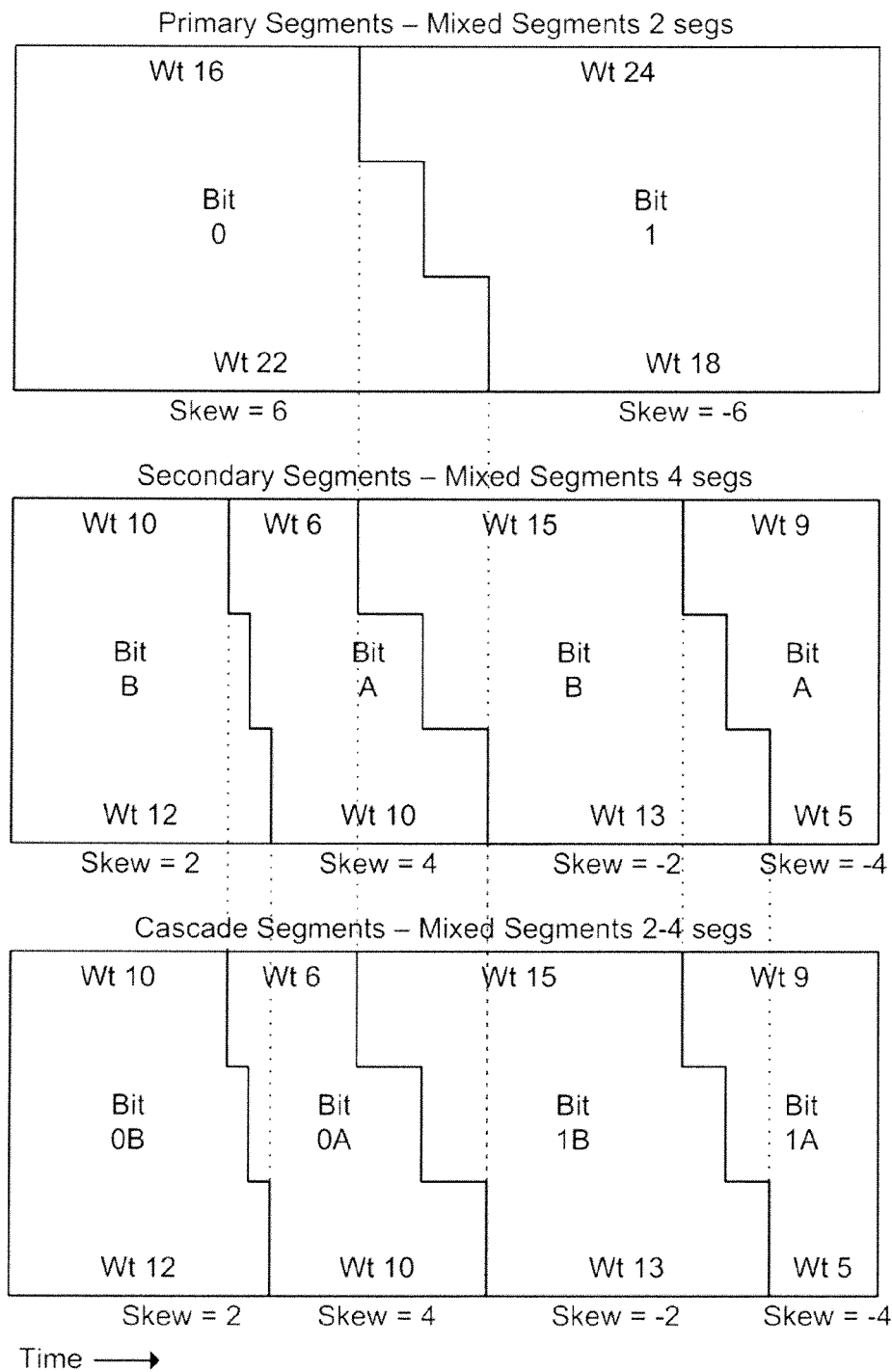
FIG. 17 shows an example mixed-mode sequence with different skew values.

For sequences that are all global, all phased by line, or all phased by block, the construction methods described above result in zero skew. For sequences that have a mix of global and phased bit segments, additional constraints apply to the construction of the sequences. An example mixed mode sequence is shown in FIG. 16. Referring to FIG. 16, the primary segment Bit 0 has a global start and a block phased end and a skew of +6. Bit 1 has a block phased start and a global end and a skew of −6. In a conventional (non-cascaded) sequence, there would either be another subsequence with Bits 0 and 1 in reverse order to cancel the skew, or Bit 0 and Bit 1 would only be usable in conjunction with one or more segments such that their total skew is zero (or near zero). In the cascade case, the requirements are similar: First, the primary Bits 0 and 1 must appear in reverse order elsewhere in the sequence, cascaded with the secondary Bits A and B in the same order as the first instance. Second, the skew of the 'A' segments (0A and 1A) must cancel and the skew of the 'B' segments (0B and 1B) must cancel. This will insure that the skews of all combinations of Bits 0, 1, A, and B will cancel. FIG. 17 shows another mixed mode example, but with different skew values. This illustrates that there is flexibility in sequence construction, as long as the skews cancel for all combinations of the relevant bit segments.

The use of a secondary (i.e. not in sharp focus) display device in a cascade can cause severe artifacts if operated in a phased mode. The reason is that the optical blur will contaminate a given bit segment with light from vertically adjacent bit segments. During the time that vertically adjacent bit segments are displaying different bit plane data, light from above or below the boundary with contaminate the neighboring bit segments. This is known as phased leakage.

Figure 11:
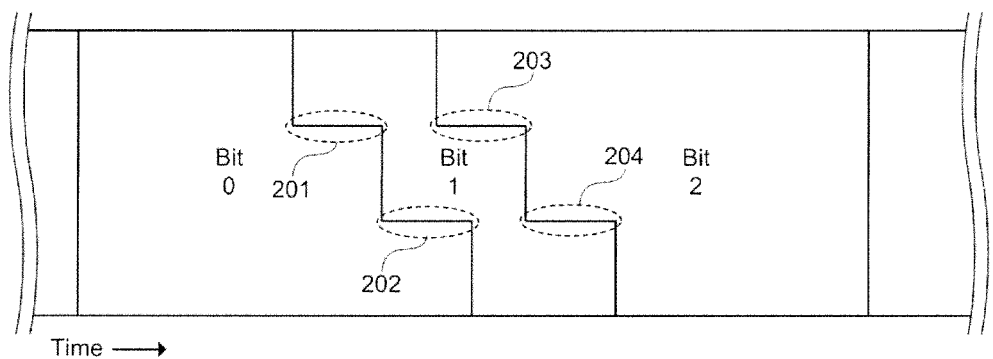
FIG. 11 shows an example of phased leakage.

FIG. 11 shows the desired bit segment pattern for a secondary imaging device. Referring to FIG. 11, at 201 and 202, Bit 1 is above Bit 0. Bit 1 will leak downwards into Bit 0 and Bit 0 will leak upwards into Bit 1. For example, if Bit 0 is predominantly OFF (i.e. dark) and Bit 1 is predominantly ON (i.e. bright), then the edges of Bit 0 at 201 and 202 will be too bright as a result of leakage across the horizontal boundary between Bit 0 and Bit 1 (201 and 202). Similarly, at 203 and 204, Bit 1 and Bit 2 will be cross-contaminated.

Figure 12:
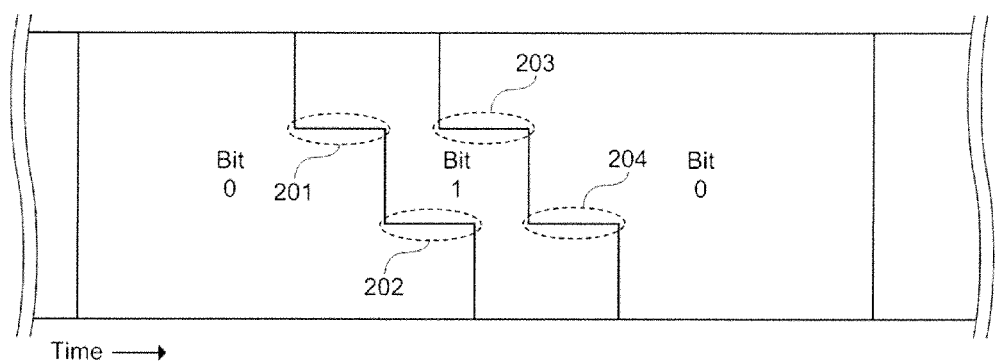
FIG. 12 shows an example of phased leakage cancellation.
Figure 13:
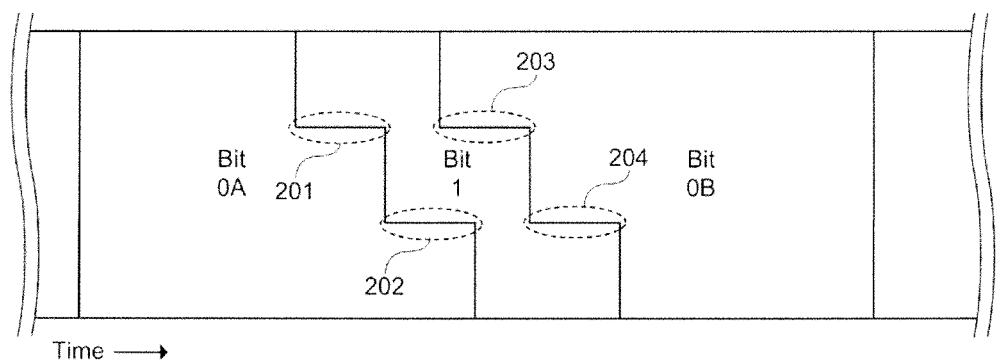
FIG. 13 shows an example of phased leakage cancellation with halftoning.

There are a number of solutions to phased leakage. One embodiment to cancel phased leakage is shown in FIG. 12, where Bit 0 is both before and after Bit 1, with both instances of Bit 0 having identical data. In this case, the leakage at 201 is exactly cancelled by the leakage at 203, and the leakage at 202 is cancelled by the leakage at 204. Another embodiment is shown in FIG. 13, where Bit 0 is again both before and after Bit 1. However, in this case the data for the two Bit 0 segments is not identical. Instead, the data is the result of separate halftone or multitone operations, such that the data is very similar, but 'dot on dot' conditions are avoided or reduced. The leakage is effectively cancelled and the contrast or visibility of toning or dither is reduced by up to 50%, as will be apparent to one skilled in the art of multitoning.

Figure 14:
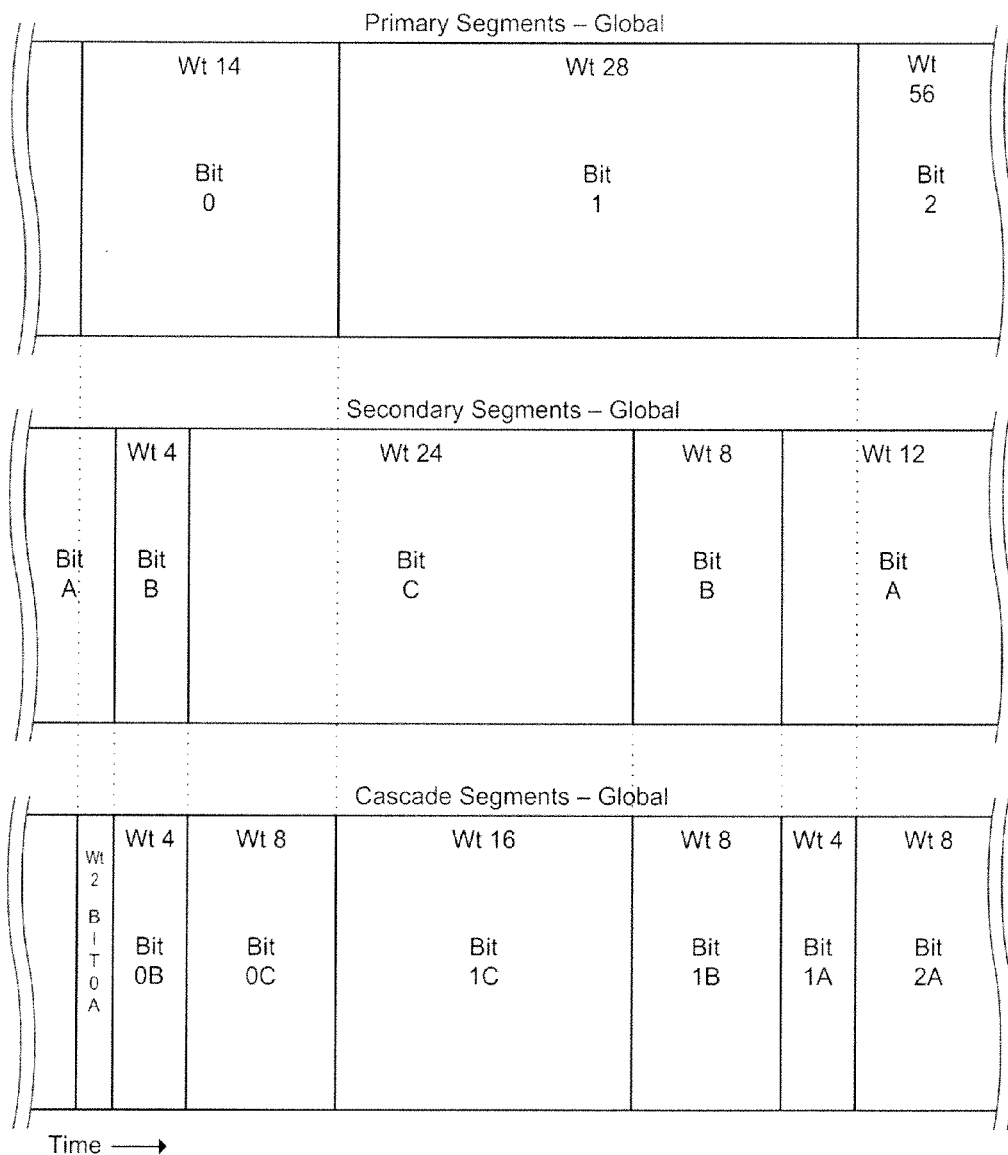
FIG. 14 shows an example of a cascaded global sequence with 3 secondary bits.

It can be advantageous for one or more of the display devices in a cascade to be capable of operating faster than the other device(s). FIG. 14 shows an example using more than two bits in a secondary sequence by taking advantage of a faster display device for the secondary display. In this example, 3 secondary bits are used in a sub-sequence. A device may be faster due to lower resolution, or due to higher speed technology.

Figure 15:
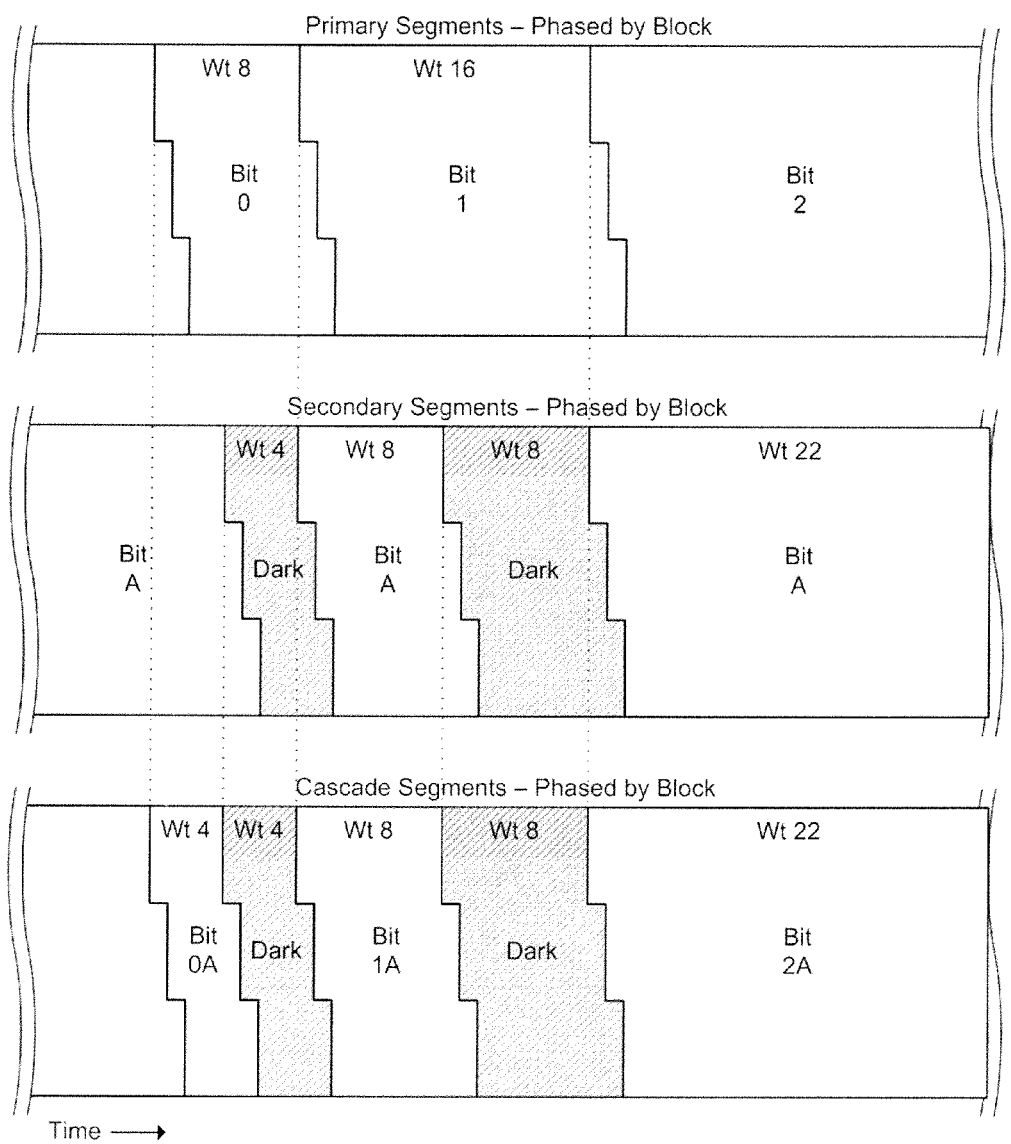
FIG. 15 shows an example from the prior art of cascaded sequences with dark time.

FIG. 15 depicts an approach taught in U.S. patent application Ser. No. 11/617,872 (U.S. Patent Application Publication No. 2008/0158245) and U.S. patent application Ser. No. 11/648,346 (U.S. Patent Application Publication No. 2008/0158263), in which certain bit segments of a primary display device are cut off early by a secondary display device. This can provide smaller effective bits for the primary device, but adds unconditional dark time to the sequence (i.e. time that cannot be used to provide light in normal operation). The shorter the desired effective bit segment, the more dark time is required. An advantage of the present method is that it provides small bits (i.e. short segments) without any unconditional dark time, as shown in FIG. 7.

To allow cascaded sequences to operate independently and without interference and avoid unwanted interaction between cascaded digital display devices, the several rules below must be followed in the design and operation of the sequences:

1. The display devices must be frame-locked, so that the timing relationship between the sequences is maintained throughout each frame.
2. For each display device, the ratios of bit plane weights must remain constant.
    a. For any combination of bit planes on a primary display device, the ratios of the resulting weights of the bit planes on any other cascaded display device(s) must remain constant.
    b. For any combination of bit planes on a secondary display device, the ratios of the resulting weights of the bit planes on any other cascaded display device(s) must remain constant.
3. For each display device, the amount of bit plane skew must remain constant.

a. For any combination of bit planes on a primary display device, the resulting skew of the bit planes on any other cascaded display device(s) must remain constant.
b. For any combination of bit planes on a secondary display device, the resulting skew of the bit planes on any other cascaded display device(s) must remain constant.

4. Bit plane phased leakage must be compensated for or avoided.
a. For any combination of bit planes on a primary display device, the net phased leakage of the bit planes on any other cascaded display device(s) must remain zero (or near zero).
b. For any combination of bit planes on a secondary display device, the net phased leakage of the bit planes on any other cascaded display device(s) must remain zero (or near zero).

REFERENCES

U.S. Patent Documents

U.S. Pat. No. 6,774,916
U.S. Pat. No. 7,446,785
U.S. Pat. No. 7,576,759
U.S. Patent Application Publication No. 2008/0158245
U.S. Patent Application Publication No. 2008/0158263

What is claimed is:

1. A method for designing and using cascaded bit sequences for a cascaded display system comprising a plurality of cascaded display devices and producing one or more images, comprising:
   constructing cascaded bit sequences for the one or more images, wherein the cascaded bit sequences are constructed of segments and bits so that
   (a) the cascaded display devices utilize frames that are locked, wherein timing between the cascaded bit sequences is maintained throughout each frame of each cascaded display device,
   (b) for each cascaded display device, a ratio of bit plane weights remains constant,
   (c) bit plane skew remains constant,
   (d) bit plane phased leakage is avoided, and
   (e) the cascaded bit sequences are constructed to include short bits without including additional dark time; and
   implementing the cascaded bit sequences on the cascaded display system to produce a desired multiplication of intensities of the one or more images, wherein the cascaded bit sequences for each cascaded display device do not otherwise interact with or affect each other.

2. The method of claim 1, wherein the cascade bit sequences comprise sub-sequences and wherein the constructing step adds one or more bits of depth for at least one sub-sequence in a frame.

3. The method of claim 2, wherein the one or more bits comprise different weights.

4. The method of claim 1, wherein the cascade bit sequences comprise sub-sequences, wherein the constructing step adds one or more bits of depth for multiple sub-sequences in a frame, and wherein the one or more bits comprise different weights.

5. The method of claim 1, wherein the bits have binary or arbitrary weights.

6. The method of claim 1, wherein the cascade bit sequences have an update mode that is all global, all phased by line, or all phased by block, and wherein bit plane skew is zero.

7. The method of claim 1, wherein the step of constructing the cascade bit sequences further comprises repeating certain bits in reverse order, whereby bit plane phased leakage is avoided.

8. The method of claim 1, wherein the cascade bit sequences have an update mode that is a combination of at least two of global, phased by line, or phased by block, and wherein the step of constructing the cascade bit sequences further comprises repeating certain bits in reverse order and adjusting skew of the segments to cancel for all combinations of the segments and produce a total skew of zero.

9. The method of claim 1, wherein the cascaded display devices utilize frame synchronization and otherwise operate independently.

10. The method of claim 1, wherein at least one of the cascaded display devices is a secondary display device.

11. The method of claim 10, further comprising the step of operating the secondary display device in global update mode.

12. The method of claim 10, wherein at least one of the cascaded display devices is a primary display device.

13. The method of claim 12, wherein the secondary display device operates faster than the primary display device.

14. The method of claim 12, wherein the primary display device operates faster than the secondary display device.

* * * * *

UNITED STATES PATENT AND TRADEMARK OFFICE
CERTIFICATE OF CORRECTION

| | |
|---|---|
| PATENT NO. | : 9,591,188 B2 |
| APPLICATION NO. | : 14/446374 |
| DATED | : March 7, 2017 |
| INVENTOR(S) | : Bradley William Walker |

It is certified that error appears in the above-identified patent and that said Letters Patent is hereby corrected as shown below:

On the Title Page

1. In Item (73), under "Assignee", in Column 1, Line 1, delete "BASS" and insert -- BRASS --, therefor.

Signed and Sealed this
Tenth Day of October, 2017

Joseph Matal
*Performing the Functions and Duties of the*
*Under Secretary of Commerce for Intellectual Property and*
*Director of the United States Patent and Trademark Office*